US005435614A

United States Patent [19]

Nordberg

[11] Patent Number: 5,435,614

[45] Date of Patent: Jul. 25, 1995

[54] AUTOMOBILE ASSIST TRANSFER SEAT FOR THE PHYSICALLY CHALLENGED

[76] Inventor: Paul R. Nordberg, 380 El Nido Ave., Pasadena, Calif. 91107

[21] Appl. No.: 289,530

[22] Filed: Aug. 12, 1994

[51] Int. Cl.[6] .................................. B60N 2/00

[52] U.S. Cl. .................................. 296/65.1; 296/63; 296/209; 297/115; 297/232; 297/411.21

[58] Field of Search .................................. 296/63, 65.1, 209; 297/115, 232, 419.21, DIG. 10; 414/921

[56] References Cited

U.S. PATENT DOCUMENTS 5,207,549 5/1993 Riva .................................. 414/340

FOREIGN PATENT DOCUMENTS 2718484 11/1978 Germany .................................. 296/63

3617292 7/1987 Germany .................................. 296/63

*Primary Examiner*—Dennis H. Pedder

[57] ABSTRACT

An automobile assist transfer seat for the physically challenged, consisting of, a removable seat assembly (70), that slips into a door sill assembly (80), affixed to automobile door sill (90R) and (90L). Automobile used is a standard coupe or sedan body style, having a seat, door, door frame and door sill on driver and passenger side. The seat assembly (70) is interchangeable for use on either side of the automobile. Height of seat assembly (70), installed, is the height of most wheelchair seats and automobile manufacturers installed seats, and parallel to the ground. Seat assembly (70), is stored in the automobile passenger seating area or trunk of the automobile.

2 Claims, 4 Drawing Sheets

AUTOMOBILE ASSIST TRANSFER SEAT FOR THE PHYSICALLY CHALLENGED

BACKGROUND—FIELD OF THE INVENTION

Present invention a removable seat, that will assist a physically challenged or otherwise disabled person get into or out of an automobile.

BACKGROUND—DESCRIPTION OF PRIOR ART

Standard passenger coupe and sedan automobile body styles have a gap up to nine inches between the outside edge of the driver and passenger front seats, and the outside edge of the automobile door frame. This gap, for a number of disabled persons, when attempting the transfer to or from an automobile becomes insurmountable without assistance.

Several devices exist that assist a disabled person in making this transition. They vary from a simple slide board that lays between a wheelchair seat and the automobile seat, to a complex and mechanized seat that completely replaces the seat provided by the automobile manufacturer.

Transfer seat in U.S. Pat. No. 5,207,549 to Riva, 1993 May 4, depends on a wheelchair with a removable arm for operation of the invention. Many disabled persons do not use a wheelchair when entering or getting out of an automobile.

U.S. Pat. No. 5,040,832 to Zalewski, 1991 Aug. 20, requires that the seat provided by the automobile manufacturer be removed and replaced with a mechanized seat. Too completely replace the seat provided by the automobile manufacturer is expensive and subject to maintenance and repair.

An apparatus for transfer of disabled persons in U.S. Pat. No. 5,153,953 to Sumrall, 1992 Oct. 13, is a lifting and loading device not attached to an automobile. This device is mounted to a movable frame on casters and utilizes a vertical jack.

SUMMARY OF THE INVENTION

Principle objects of my invention is to provide a removable seat in conjunction with an automobile door sill. To assist wheelchair confined, elderly and infirm, back injury sufferers, severe rheumatic or arthritic sufferers, and long term recovery patients make the transfer in or out of an automobile.

Additional objectives of the present invention are; same removable seat assembly 70, is interchangeable on both the driver and passenger side of the automobile. It is simple in design and use, lightweight, easily installed, easily removed, easily stored, and not mechanized. Present invention does not require a wheelchair. For wheelchair confined persons my invention is a benefit when loading a wheelchair, unassisted, behind the drivers seat. This is because the seat projects out beyond the outside of the automobile door frame.

BRIEF DESCRIPTION OF THE DRAWINGS

My invention will be more fully understood by reference to the following detailed description thereof when read in conjuction with attached drawings, and wherein.

Figure 1:
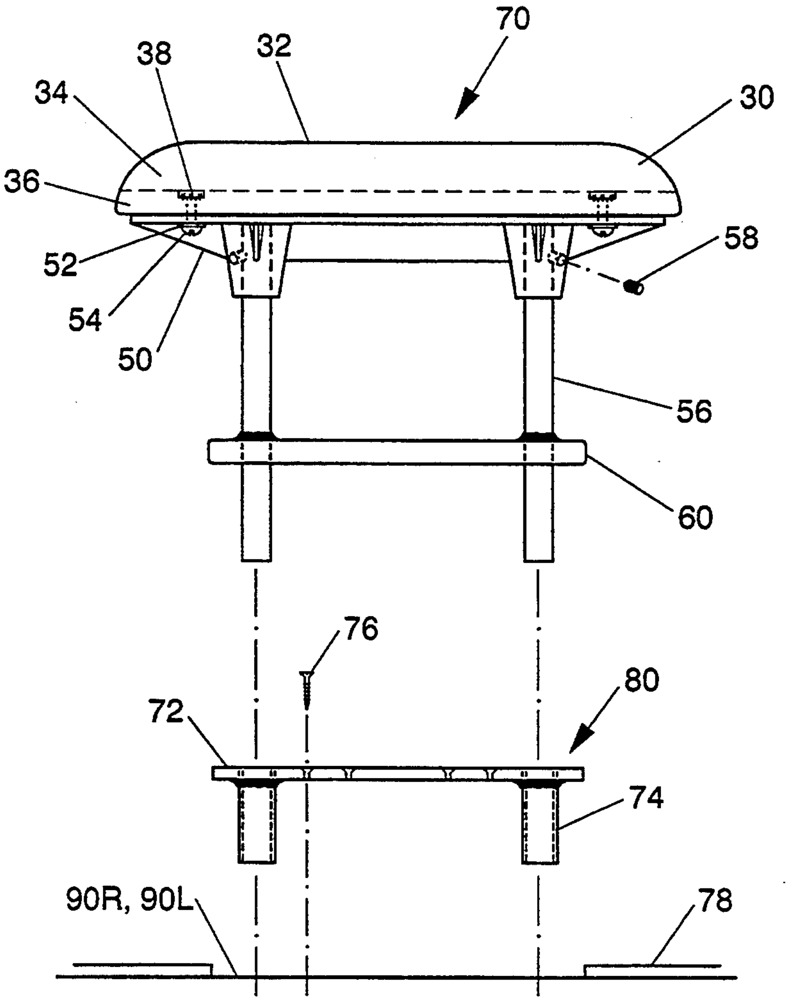
FIG. 1 is an exploded view of present invention and all parts.
Figure 2:
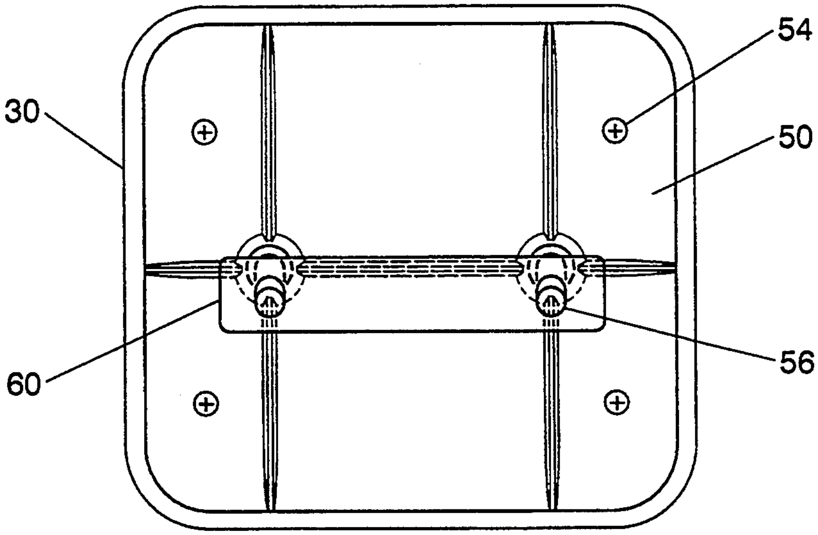
FIG. 2 is a bottom view of the removable seat assembly.
Figure 3:
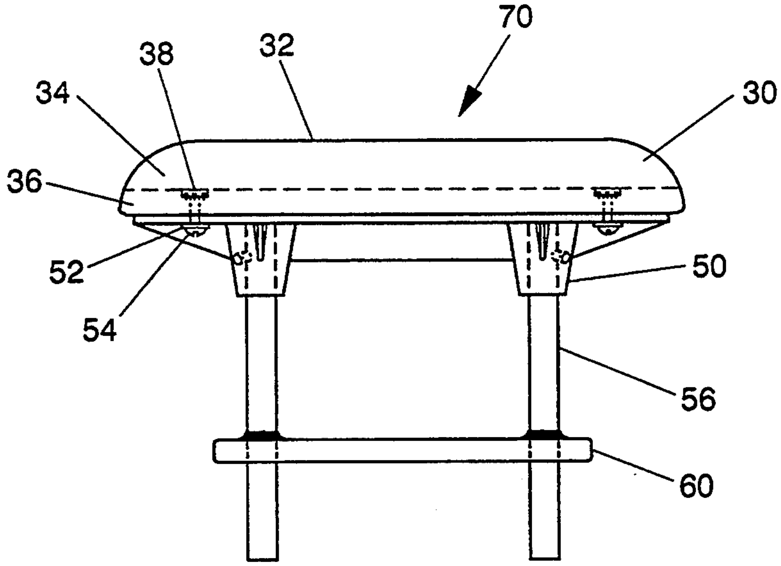
FIG. 3 is a side elevational view of removable seat assembly.
Figure 4:
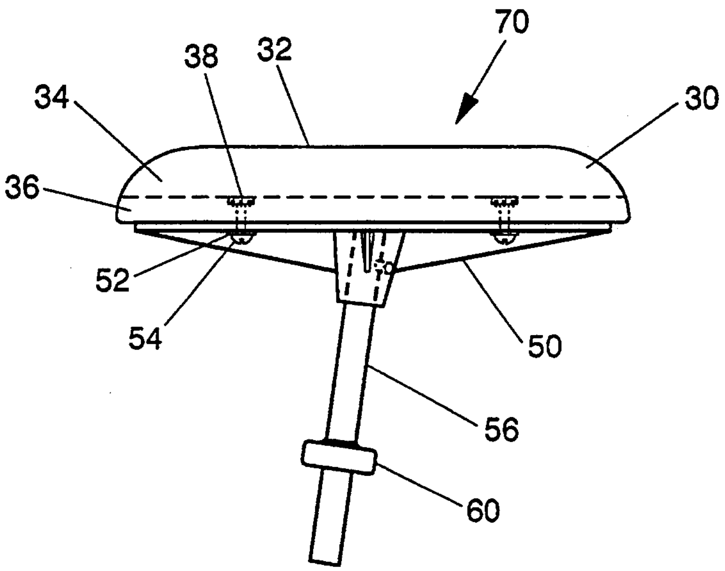
FIG. 4 is a front elevational view of removable seat assembly.
Figure 5:
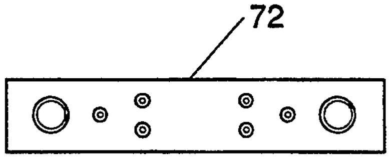
FIG. 5 is a top view of the door sill plate assembly.

| Reference Numerals in Drawings | |
|---|---|
| 70 removable seat assembly | 54 machine screw |
| 30 upholstered seat | 56 support rod |
| 32 vinyl or leather cover | 58 set screw |
| 34 foam rubber cushion | 60 stop bar |
| 36 plywood seat plate | 80 door sill assembly |
| 38 grip nut | 72 door sill plate |
| 50 cast aluminum seat plate | 74 tube sleeve |
| 52 lock washer | 76 self tapping screw |
| 90R, 90L automobile door sill | 78 automobile door sill cover |

DETAILED DESCRIPTION OF THE DRAWINGS

Present invention consists of two assemblies, a removable seat assembly 70, and the door sill assembly 80, as shown in FIGS. 1, 3, 4, 6, 8.

Removable seat assembly 70, consists of upholstered seat 30, cast aluminum seat plate 50, four lock washers 52, four machine screws 54, two support rods 56, two set screws 58, and stop bar 60, as shown in FIGS., 1, 3, 4, 8.

Figure 7:
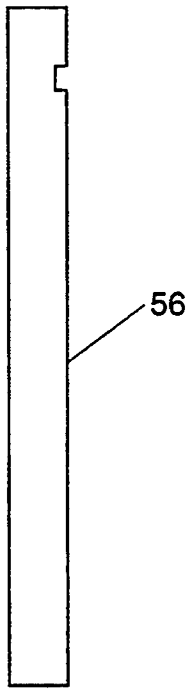
FIG. 7 is a side elevational view of support rod.
Figure 8:
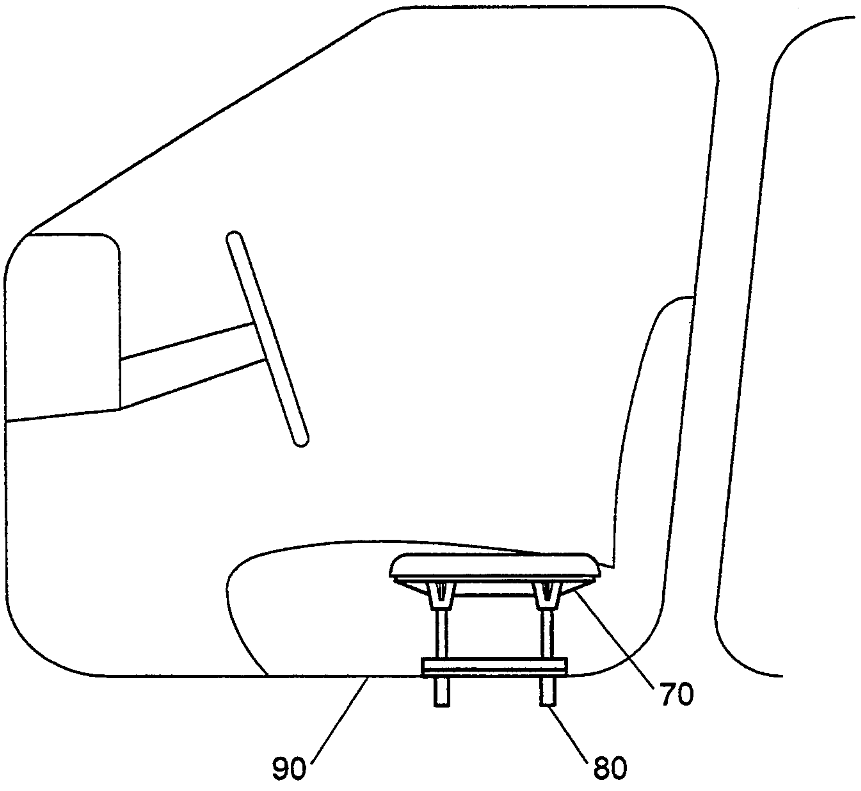
FIG. 8 is a view showing my invention installed in relation to the automobile.

Upholstered seat 30 is attached to cast aluminum seat plate 50, with machine screws 54, and lock washers 52. Two holes are drilled in cast aluminum seat plate 50 to receive support rods 56. Two holes are drilled and threaded in cast aluminum seat plate 50 to receive set screws 58 which secure support rods 56 in place, as shown in FIGS. 1, 2, 3, 4. Each support rod 56 is has a keyway slot for seating the set screw 58, as shown in FIG. 7.

Two holes are drilled in stop bar 60, exactly the same diameter and same distance between centers as those drilled in the cast aluminum seat plate 50. Support rods 56 are slipped through the holes in the stop bar 60 and welded parallel and perpendicular to the stop bar 60, as shown in FIGS. 1,2, 3, 4.

Figure 6:
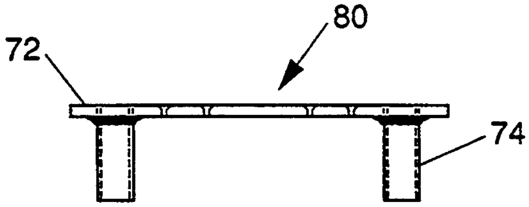
FIG. 6 is a side elevational view of door sill assembly.

Door sill assembly 80 consists of a door sill plate 72, two tube sleeves 74, and six self tapping screws 76. Two door sill assemblies 80 are required, one for the driver side and one for the passenger side of the automobile. Two holes are drilled in the door sill plate 72 exactly the same distance between centers but larger in diameter than those drilled in the stop bar 60. Tube sleeves 74 are slipped through the door sill plate 72, with the top end flush with the top side of the door sill plate 72 and welded parallel and perpendicular on the bottom side of the door sill plate 72. Holes are drilled and countersunk in the door sill plate 72 to receive the self tapping screws 76, as shown in FIGS. 1, 6.

The automobile door sills 90R, driver side, and 90L, passenger side are drilled to receive door sill assembly 80. A door sill assembly 80 is attached to each automobile door sill 90, with self tapping screws 76. To properly install door assembly 80, it is first necessary to remove the automobile door sill cover 78, if one is installed on the automobile door sill 90R, 90L. This automobile door sill cover 78 is altered by cutting out a portion the size and shape of door sill plate 72. This will allow door sill assembly 80, to sit down flush on metal automobile door sill 90R, 90L. Automobile door sill cover 78 is reinstalled after door sill assembly 80 is installed.

I claim:

1. An automobile assist transfer seat for the physically challenged for use on a door sill on either driver or passenger sides of the automobile comprising:

a removable seat assembly with upholstered seat;

support rods extending downwardly from the seat assembly;

a stop bar fastened to and projecting between the support rods; and a door sill assembly with a door sill plate;

tube sleeves extending downwardly from the sill plate;

wherein the sill plate is configured to be secured to the door sill with the tube sleeves inserted into mating holes in the door sill, and the support rods are configured to extend into the tube sleeves with the stop bar abutted to the sill plate to support the seat assembly.

2. The door sill assembly of claim 1, wherein the support rods are asymmetrically positioned on the seat assembly and installation at the opposite side of the automobile is achieved by rotating the seat one hundred and eighty degrees.

* * * * *